United States Patent [19]

Decker, Jr. et al.

[11] Patent Number: 5,531,976
[45] Date of Patent: Jul. 2, 1996

[54] PREPARATION OF ALUMINA HAVING INCREASED POROSITY

[75] Inventors: Lewis B. Decker, Jr., Lago Vista, Tex.; Dwight D. Erickson, Oakdale, Minn.; David A. Barclay, Austin, Tex.

[73] Assignee: Condea Vista Company, Houston, Tex.

[21] Appl. No.: 392,610

[22] Filed: Feb. 22, 1995

Related U.S. Application Data

[63] Continuation of Ser. No. 143,982, Oct. 27, 1993, abandoned, which is a continuation of Ser. No. 849,747, Mar. 12, 1992, abandoned.

[51] Int. Cl.$^6$ ........................................... C01F 7/02
[52] U.S. Cl. .................. 423/625; 423/626; 423/628
[58] Field of Search .................. 423/628, 625, 423/626; 252/315.7

[56] References Cited

U.S. PATENT DOCUMENTS

| | | | |
|---|---|---|---|
| 4,248,852 | 2/1981 | Wakabayashi et al. | 423/626 |
| 4,676,928 | 6/1987 | Leach et al. | 423/630 |
| 4,861,410 | 8/1989 | Clark et al. | 252/315.7 |
| 5,055,019 | 10/1991 | Meyer et al. | 423/628 |
| 5,077,032 | 12/1991 | Mizukami et al. | 423/625 |

*Primary Examiner*—Steven Bos
*Attorney, Agent, or Firm*—Browning, Bushman, Anderson & Brookhart

[57] ABSTRACT

A process for making high porosity boehmite alumina comprising forming an aqueous dispersion of a boehmite alumina which has been obtained by hydrothermally treating an aqueous mixture of a precursor boehmite alumina at a pH of from about 5 to about 9 for a period of time sufficient to convert the greater portion of the precursor boehmite alumina to a colloidal sol, treating the dispersion of the hydrothermally treated alumina to form a viscous gel and subjecting the gel to sufficient shearing force for a sufficient period of time to increase the pore volume by at least 30% and the median pore radius by at least 20%.

10 Claims, No Drawings

PREPARATION OF ALUMINA HAVING INCREASED POROSITY

This is a continuation of U.S. application Ser. No. 08/143,982, filed on Oct. 27, 1993, now abandoned, which is a continuation of U.S. application Ser. No. 07/849,747, filed on Mar. 12, 1992, now abandoned.

BACKGROUND OF THE INVENTION

1. Field of the Invention

The present invention relates to a process for preparing alumina having increased porosity. More particularly, the present invention relates to a process in which the porosity of alumina can be controlled.

2. Description of the Background

Alumina finds wide use in the manufacture of ceramic filters, catalyst supports, etc., where chemical and/or heat resistance is necessary. For example, autocatalyst supports used in catalytic converters are subject to high temperatures which can affect the structural stability of the catalyst support. Additionally, in order for an autocatalyst support to function effectively it is desirable that the catalyst support have a sufficiently great porosity so as to render the support more user friendly to catalyst(s) deposited on the support to provide a larger active catalytic surface for deposition of the catalyst. Further, increased porosity makes the catalyst deposited on the support more accessible to reactants as well, increasing the effectiveness of the catalyst. Aluminas of enhanced porosity can also be used, for example, to produce ceramic filters of greater efficiency and, in colloidally dispersed form, efficient thixotropes.

SUMMARY OF THE INVENTION

It is therefore an object of the present invention to provide an alumina having increased porosity.

Another object of the present invention is to provide an alumina which can be used to make high porosity catalyst supports and porous ceramic bodies.

Still another object of the present invention is to provide a a process in which the porosity of boehmite alumina can be controlled to a desired extent.

The above and other objects of the present invention will become apparent from the description given herein and the appended claims.

The present invention is based upon the finding that by subjecting gels of certain aluminas to working, e.g. shearing, porosity, in terms of an increase in both the median pore radius and the total pore volume, can be increased. Specifically, the working of the alumina gel is continued until the median pore radius increases by at least about 20 percent and the total pore volume increases by at least about 30 percent. The porosity of certain hydrothermally treated boehmite aluminas which are generally considered water-dispersible can be greatly increased according to the process of the present invention. It is believed that these aluminas exist as aggregates or agglomerates which in turn are comprised of generally well-ordered stacks or bundles of crystallites. By de-agglomerating these stacks of crystallites by shear, increased voids are created between the now randomly ordered crystallites. This de-agglomeration is reflected in an increase in both median pore radius and total pore volume of the material.

DETAILED DESCRIPTION OF THE PREFERRED EMBODIMENT

The aluminas which can be treated according to the process of the present invention are boehmite aluminas which have been hydrothermally treated under conditions to convert the greater portion of the boehmite alumina to a colloidal sol, the thus hydrothermally treated aluminas forming the starting material boehmite alumina for use in the process of the present invention. The beohmite alumina which is hydrothermally treated, hereinafter referred to as precursor boehmite alumina, is preferably, although not necessarily, obtained by the hydrolysis of an aluminum alkoxide in the well known fashion. The aluminum alkoxide (trialkoxide) can be produced, in the well known manner, by reacting a low molecular weight alcohol, a linear or branched chain, with an aluminum-bearing material. Such aluminum-bearing materials include pure aluminum and mixed alloy scrap. Typical methods for preparing such aluminum alkoxides are shown, for example, in U.S. Pat. No. 4,242,271, incorporated herein by reference for all purposes. The aluminum alkoxide can be hydrolyzed in the well known manner, such as by the process taught in U.S. Pat. No. 4,202,870, incorporated herein by reference for all purposes. Especially preferred are aluminas obtained from the hydrolysis of aluminum alkoxides derived from Ziegler Chemistry in the well known manner. While the preferred feedstock used as the precursor alumina is an alumina slurry, particularly a slurry produced by the hydrolysis of aluminum alkoxides, it will be recognized that aluminas from other sources can be formed into slurties and hydrothermally treated to produce the precursor alumina.

The starting material boehmite alumina used in the process of the present invention can be obtained according to the process disclosed and claimed in U.S. Pat. No. 4,676,928, incorporated herein by reference for all purposes. Basically, the process disclosed in U.S. Pat. No. 4,676,928 involves taking a precursor boehmite alumina, forming the precursor alumina into an aqueous slurry or mixture, the pH being in the range of from about 5 to about 9, and then heating the aqueous slurry of the precursor alumina at elevated temperatures, generally about 70° C. or greater, for a sufficient period of time to convert the greater portion of the precursor boehmite alumina to a colloidal sol.

In using the process disclosed in U.S. Pat. No. 4,676,928 to form the starting material boehmite alumina used in the present process, a colloidal sol can be employed. Alternately, a colloidal sol which has been dried to form a dried powder can be formed into an aqueous dispersion and used. In either event, the alumina content will range from about 15 to about 55 percent-by-weight calculated as $Al_2O_3$, depending on whether or not a gelling agent is employed. In cases where a gelling agent is employed, the gel will normally contain from about 15 to about 25 percent-by-weight $Al_2O_3$. In the absence of a gelling agent, the gel will generally contain from about 35 to about 55 percent-by-weight $Al_2O_3$.

Generally the process is conducted by forming an aqueous slurry or dispersion, either as the sol as described above, or by dispersing a dried sol in an aqueous medium. Once the slurry of the starting material boehmite alumina has been formed, it must be gelled or thickened to increase the viscosity prior to being worked. The term "gel" as used herein refers to a suspension, colloidal in nature, in which shearing stresses below a certain finite value fail to produce permanent deformation. Gelling of the alumina slurry can be carried out simply by concentrating the slurry by the removal of water to form a viscous gel of increased alumina content. Additionally, or alternatively, the gelling of the dispersion can be carried out by the addition of gelling agents. Such gelling agents are generally water-soluble compounds which are well known by those skilled in the art to be compounds which will de-stabilize aqueous colloidal systems. Non-limiting examples of such gelling agents include mineral acids such as nitric acid, hydrochloric acid, etc., organic acids such as formic acid, acetic acid, etc., polyvalent metal salts, etc. For example, water-soluble salts of certain polyvalent metals such as the nitrates, chlorides, acetates, sulfates, etc., of metals such as aluminum, iron, magnesium, manganese, etc. can be used. When employed, such gelling agents will be added in an amount sufficient to increase the viscosity to the desired degree, i.e. until a gel is formed, amounts of from about 0.1 to about 50 percent-by-weight based on the weight of alumina in the gel being generally used.

It is generally necessary, when viscosifying the alumina dispersion, whether such be accomplished by concentrating the dispersion and/or the addition of gelling agents, to add sufficient acid to maintain the gelled alumina in a flowable condition. Generally speaking, monobasic acids such as nitric acid, hydrochloric acid, formic acid, acetic acid, and so forth can be employed. The amount of acid added should be kept to a minimum, consistent with achieving desired gelling, as increased acid decreases porosity.

Working or shearing of the gel to the desired extent can be accomplished in a variety of equipment and under widely varying conditions. In general, any apparatus which is capable of imparting high shear to viscous systems can be employed. Non-limiting examples of apparatus which can be used to carry out the working or shearing step include plastic melt viscometers, mullers commonly used for mixing paste-like materials, driers for preparing high viscosity pastes and gels and the like. Parameters such as shear rate, shear time, temperature, etc. will vary depending upon the concentration of alumina in the gel, the type of gelling agent employed, the type of precursor boehmite employed and the type of hydrothermal treatment applied to the precursor alumina to obtain the staring material boehmite used in the process of the present invention. In general, conditions of high shearing, high concentration of alumina in the gel and minimum acid concentration are preferred. Temperature can vary widely as from ambient to about 100° C. In general, the gel will be subjected to a sufficient shearing force, for a sufficient period of time to increase the pore volume by at least 30% and the median pore radius by at least 20% over that of the alumina in the unworked gel. Such increase in porosity parameters can be determined by techniques well known to those skilled in the art.

It can be shown by transmission electron microscopy (TEM) that ordinary boehmite which has not been treated according to the process of U.S. Pat. No. 4,676,928, exists in the form of extensive aggregates of individual crystallites of relatively small size, i.e. less than about 50Å in thickness (020 plane). Such aluminas exhibit extensive aggregation of the crystallites, i.e. microgels. Aluminas which have been preparing according to the process of U.S. Pat. No. 4,676,928, as seen by TEM, also exist as aggregates but unlike ordinary boehmite the microgels are made up of stacks of plate-like crystallites which are generally highly oriented. When the latter type of alumina starting material is treated according to the process of the present invention, and again as can be observed by TEM microscopy, the oriented, stacks of crystallites become much more randomly oriented or de-agglomerated resulting in a more open structure of the aggregates, i.e. increased porosity. Thus, to achieve the unexpected increase in porosity using the process of the present invention, it is necessary to employ a starting material alumina which has been prepared in accordance with the process of U.S. Pat. No. 4,676,928 or an equivalent wherein the alumina exists essentially as microgels comprising stacks of plate-like crystallites. Such staring material aluminas can be characterized as being comprised of microgels which are comprised of numerous, associated stacked crystallites on the order of from about 50 to about 150 nm in diameter, the individual crystallite size being on the order of from about 50 to about 150Å in thickness (020 plane).

To further illustrate the invention, the following non-limiting examples are presented. The DISPAL® aluminas used in the following examples are boehmite aluminas marketed by Vista Chemical Company and made in accordance with the teachings of U.S. Pat. No. 4,676,928.

EXAMPLE 1

This is a comparative example and shows the porosity of a typical alumina obtained according to the process of U.S. Pat. No. 4676,928. A sample of DISPAL® alumina sol containing approximately 20% $Al_2O_3$ by weight was oven dried at 66° C. to a solid form and then fired at 650° C. The product was analyzed by mercury porosimetry and showed a median pore radius of 51 Angstroms and a pore volume of 0.33 cc/g.

EXAMPLE 2

1000 g of DISPAL® alumina sol (20% $Al_2O_3$) were placed in a mixing chamber of a Baker-Perkins muller, and mulled for 1 hour. The sample was dried, fired and analyzed as described in Example 1. Porosimetry measurements indicated a median pore radius of 47.3 Angstroms and a pore volume of 0.37 cc/g. This example demonstrates that working of dispersions of low viscosity, i.e. ungelled materials, does not result in any appreciable increase in porosity of the staring material boehmite.

EXAMPLE 3

700 g of DISPAL® alumina powder were placed in the mixing chamber of a Baker-Perkins muller. 602.3 g of deionized water were added while mixing, generating a gelled, concentrated dispersion containing 43% $Al_2O_3$. Mixing was continued for 1 hour, during which period the material became very viscous. A sample was dried, fired, and analyzed as described in Example 1. Mercury porosimetry measurements showed a median pore radius of 72.8Å and a pore volume of 0.60 cc/g. As compared with the unworked sample of Example 1 or the worked, un-gelled sample of Example 2, this example demonstrates an increase of nearly 43 % in median pore radius and about 82% in pore volume. Thus, this example demonstrates that gelling of the alumina is necessary to increase the viscosity and hence increase the amount of work available to de-agglomerate the boehmite crystallites.

EXAMPLE 4

600 g of DISPAL® sol containing approximately 25 % $Al_2O_3$ were mixed with 24.9 g of a 50% (w/w) Al $(NO_3)_3$ 9 $H_2O$ solution (gelling agent) to form a gelled dispersion. This sample was worked for 10 minutes at 60° C. at 110 rpm on a Rheocord torque rheometer equipped with a Rheomix mixing head. Porosimetry results are given below in Table 1.

EXAMPLE 5

100 g of DISPAL® alumina sol containing approximately 20% $Al_2O_3$ were mixed with 15.4 g of 67% $Mg(NO_3)_2$ 6 $H_2O$ solution (gelling agent). The resulting gel was worked at 100 rpm for 20 minutes on the torque rheometer used in Example 4. Porosimetry results are given below in Table 1.

EXAMPLE 6

33.7 g of DISPAL® alumina powder were mixed with 86.3 g of DISPAL® alumina sol to give an alumina dispersion containing 30% $Al_2O_3$. 27.7 g of 10% $HNO_3$ solution were added to gel the dispersion. The sample was worked as described above in Example 5. Porosimetry results are given below in Table 1.

TABLE 1

| Exp. | Gelling Agent | Median Pore Radius (Å)/Pore Volume (cc/g) | | | |
|---|---|---|---|---|---|
| | | Radius | Increase | Volume | Increase |
| 4 | Al(NO3)3 | 79 | 55% | 0.56 | 70% |
| 5 | Mg(NO3)2 | 143 | 180% | 0.95 | 188% |
| 6 | HNO3 | 106 | 108% | 0.87 | 163% |

It can be seen by comparing the data in Table 1 that there is a substantial increase in median pore radius and pore volume as compared with the unworked material of Example 1.

EXAMPLES 7–10

These examples demonstrate that the working of high viscosity gels of aluminas that have not been hydrothermally treated, e.g. that have not been prepared in accordance with the process of U.S. Pat. No. 4,676,928, does not lead to any significant increase in overall porosity in terms of median pore radius and pore volume. Samples of CATAPAL® A, B and D, boehmite aluminas marketed by Vista Chemical Company, and DISPERAL® a boehmite alumina marketed by Condea Chemie were mixed, respectively, with sufficient acid and water to give dispersions containing approximately 20% $Al_2O_3$. The acid level was selected such that all of the materials would be dispersed to about the same extent. Each of the samples was then worked for 10 minutes at 110 rpm and 60° C. on the Haake Rheocord torque rheometer. Median pore radii and pore volumes are given below on Table 2.

hydrothermally processed in accordance with U.S. Pat. No. 4,676,928 results in boehmite alumina of greatly increased porosity. More importantly, by using such a hydrothermally prepared alumina as a starting material and controlling variables such as shear rate (rpm), shear time, concentration of the gel/gel viscosity, acid level and temperature, it is possible to tailor end product aluminas of desired porosity which can be put to end uses such as ceramic filters, autocatalyst supports, etc.

EXAMPLE

A series of alumina slurries were prepared from DISPAL® alumina sols marketed by Vista Chemical Company. The sols contained about 20% $Al_2O_3$ and sufficient acid to maintain a desired low viscosity. In order to test the samples at higher $Al_2O_3$ levels present in the DISPAL® sols, dried DISPAL® sol was added as a powder to raise the $Al_2O_3$ level up to 26.6%. Magnesium nitrate was added to the slurries as a gelling agent to provide 0.29 g $Mg(NO_3)_3$ 6 $H_2O$ per gram of $Al_2O_3$. The gels were then mixed using a Haake Torque Rheometer, a device used for mixing high viscosity fluids, especially plastic melts. The mixing rate (rpm), mixing time, solids loading and acid levels are specified in Table 3. Following the shearing (mixing), the material was removed from the mixer/rheometer and dried at 70°–80° C. over night, and then fired at 650° C. for 15 minutes. Samples were then characterized by pore size analysis (mercury porosimetry).

TABLE 2

| Ex. | Alumina | Median Pore Radius (Å) | | | Pore Volume (cc/g) | | |
|---|---|---|---|---|---|---|---|
| | | Worked | Control | % Increase | Worked | Control | % Increase |
| 7 | CATAPAL ® A | 21 | 20 | 5 | 0.21 | 0.19 | 10 |
| 8 | CATAPAL ® B | 25 | 24 | 4 | 0.28 | 0.29 | –4 |
| 9 | CATAPAL ® D | 34 | 31 | 10 | 0.32 | 0.29 | 10 |
| 10 | DISPERAL ® | 41 | 36 | 14 | 0.38 | 0.32 | 19 |

A comparison of the data in Table 2 with the data in Table 1 and the results of Example 3 clearly shows that working or shearing of hydrothermally processed aluminas leads to an unexpected increase in porosity. The data above demonstrates that working boehmite alumina which has been

TABLE 3

| Run | Mixing RPM | Mixing Time (Minutes) | Solids (% Al2O3) | Acid Level meq acid/g Al2O3 | Pore Radius at Median Volume (Å) |
|---|---|---|---|---|---|
| 1 | 100 | 10 | 26.5 | 0.30 | 109 |
| 2 | 100 | 20 | 26.5 | 0.30 | 127, 130 |
| 3 | 220 | 20 | 26.5 | 0.30 | 149 |
| 4 | 220 | 20 | 18.4 | 0.10 | 109 |
| 5 | 100 | 20 | 18.5 | 0.30 | 90 |
| 6 | 100 | 20 | 26.6 | 0.99 | 120, 121 |
| 7 | 100 | 20 | 18.4 | 0.00 | 105 |
| 8 | 100 | 20 | 26.6 | 0.00 | 143 |
| 9 | 100 | 20 | 18.4 | 0.99 | 85, 85 |
| 10 | 220 | 20 | 18.4 | 0.99 | 100 |
| 11 | 220 | 20 | 18.4 | 0.00 | 118 |
| 12 | 220 | 20 | 26.6 | 0.99 | 128 |
| 13 | 220 | 20 | 26.6 | 0.00 | 161 |
| 14 | 220 | 20 | 18.5 | 0.30 | 112 |
| 15 | 100 | 20 | 29.9 | 0.99 | 110 |
| 16 | 100 | 20 | 18.2 | 0.77 | 80 |
| 17 | 170 | 20 | 22.8 | 0.50 | 124 |
| 18 | 170 | 20 | 22.8 | 0.50 | 122 |
| 19 | 100 | 20 | 18.4 | 0.99 | 87 |
| 20 | 90 | 10 | 18.4 | 0.00 | 85 |
| 21 | 90 | 10 | 18.4 | 0.99 | 71 |
| 22 | 90 | 7 | 18.4 | 0.00 | 82 |
| 23 | 0 | 0 | 20.0 | 0.00 | 47 |

As can be seen from the data in Table 3, porosity (pore radius) is dependent upon solids loading, the degree of shear, acid level and mixing time. Run 23 is a control sample, obtained by measuring the porosity of the DISPAL® alumina sol which was dried and fired as described above. As the data clearly demonstrams, working or shearing of the alumina regardless of the degree of shear (rpm), time of shear (mixing time), solids content or acid level increases pore radius. In this regard, compare Runs 1–22 with Run 23. As the data also shows, enhanced porosity (increased pore radius) is shown by high shear, high solids loading and lower acid level. In this regard, compare the results of Run 13 (highest pore radius) with Run 3 (intermediate pore radius) and Run 12 (lower pore radius). Thus, a higher viscosity of the gel related to solids loading and/or gelling agent coupled with high shear and low acid results in a greater increase in median pore radius.

The foregoing disclosure and description of the invention is illustrative and explanatory thereof, and various changes in the method steps may be made within the scope of the appended claims without departing from the spirit of the invention.

What is claimed is:

1. A process for increasing the porosity of boehmite alumina comprising:

forming a gel of a treated boehmite alumina, said gel containing from about 15 to about 55 % by weight Al$_2$O$_3$, said treated boehmite alumina being obtained by hydrothermally treating an aqueous mixture of precursor boehmite alumina and acid for a period of time sufficient to convert the greater portion of said precursor boehmite alumina to a colloidal sol of treated boehmite alumina having a pH of above about 4; and subjecting said gel to a sufficient shearing force at a temperature of from ambient to about 100° C. for a sufficient period of time to increase the pore volume of said treated boehmite alumina in said gel by at least 30% and the median pore radius of said treated boehmite alumina in said gel by at least 20% over that of said boehmite alumina in said gel prior to shearing.

2. The process of claim 1 wherein an aqueous dispersion of said treated boehmite alumina is formed, said gel being formed from said aqueous dispersion.

3. The process of claim 2 wherein said aqueous dispersion is formed into said gel by concentrating said dispersion.

4. The process of claim 3 wherein said gel contains from about 35 to about 55 percent-by-weight alumina.

5. The process of claim 2 wherein said gel is formed by adding a gelling agent to said aqueous dispersion.

6. The process of claim 5 wherein said gel contains from about 15 to about 35 percent-by-weight alumina.

7. The process of claim 5 wherein said gelling agent comprises a water-soluble compound which will de-stabilize aqueous colloidal systems.

8. The process of claim 7 wherein said gelling agent comprises aluminum nitrate.

9. The process of claim 7 wherein said gelling agent comprises magnesium nitrate.

10. A process for increasing the porosity of boehmite alumina comprising:

forming a gel of a treated boehmite alumina comprised of microgels comprising stacked, plate-like crystallites, said stacked crystallites having a diameter of from about 50 to about 150 nm, the individual crystallite size being from about 50 to about 150 Angstroms in thickness said treated boehmite alumina being obtained by hydrothermally treating an aqueous mixture of precursor boehmite alumina and acid for a period of time sufficient to convert the greater portion of said precursor boehmite alumina to a colloidal sol of treated boehmite alumina having a pH of above about 4; and subjecting said gel to a sufficient shearing force for a sufficient period of time to increase the pore volume of said boehmite alumina in said gel by at least 30% and the median pore radius of said boehmite alumina in said gel by at least 20% over that of said boehmite alumina in said gel prior to shearing.

* * * * *